United States Patent [19]

Vaughn

[11] Patent Number: 4,770,091
[45] Date of Patent: Sep. 13, 1988

[54] ROTISSERIE INTERLOCK

[75] Inventor: William T. Vaughn, Indianapolis, Ind.

[73] Assignee: Maytag Corporation, Newton, Iowa

[21] Appl. No.: 156,463

[22] Filed: Feb. 16, 1988

[51] Int. Cl.$^4$ ............................................. A47J 37/04
[52] U.S. Cl. ................................... 99/421 H; 99/449;
126/9 R; 126/27; 126/41 B
[58] Field of Search ................. 99/421 H, 421 R, 419,
99/447, 449, 483; 126/9 B, 9 R, 41 B, 9 A, 27,
211, 299 C

[56] References Cited

U.S. PATENT DOCUMENTS

| 3,582,356 | 6/1971 | Thomas | 99/421 H |
| 3,809,053 | 5/1974 | Navarro | 126/25 R |
| 4,157,705 | 6/1979 | Caan | 126/211 |
| 4,422,441 | 12/1983 | Schoepe | 126/299 C |
| 4,442,763 | 4/1984 | Beller | 99/449 |
| 4,483,241 | 11/1984 | Vaughn | 99/421 H |
| 4,517,955 | 5/1985 | Ehrlich et al. | 126/211 |

Primary Examiner—Timothy F. Simone
Attorney, Agent, or Firm—Richard L. Ward

[57] ABSTRACT

A rotisserie accessory is provided for use with a cooking appliance having an airflow grill. Locking apparatus prevents rotational operation of a spit portion when the rotisserie accessory is improperly positioned on the cooking appliance.

11 Claims, 5 Drawing Sheets

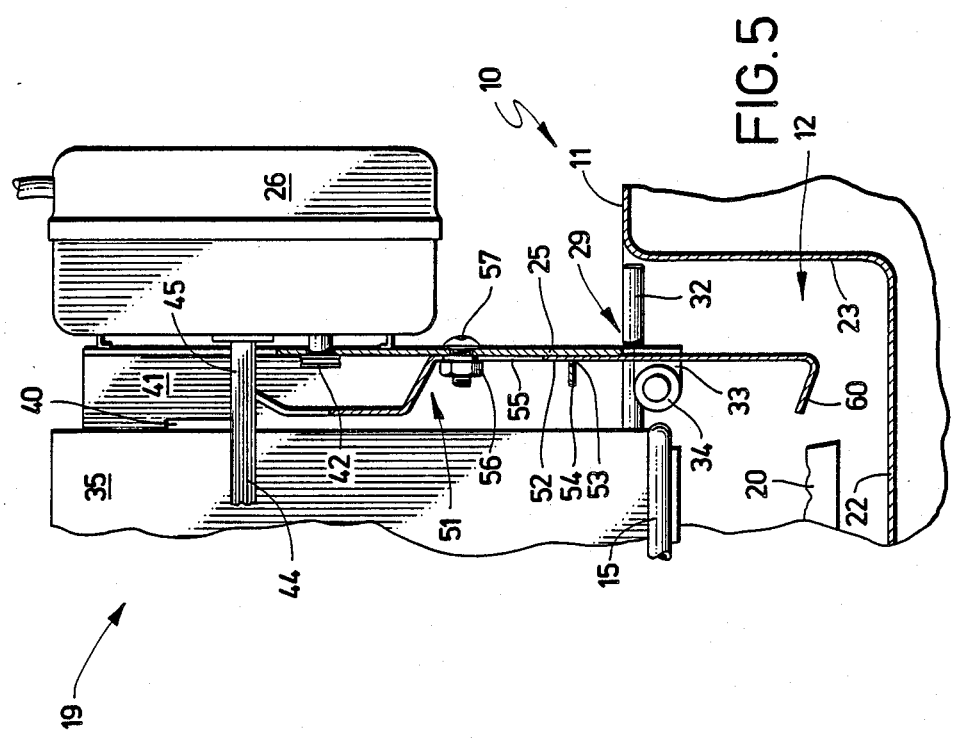

ROTISSERIE INTERLOCK

BACKGROUND OF THE INVENTION

This invention relates generally to the field of cooking products and more particularly to an interlock device for a rotisserie accessory. The interlock device is operable for preventing rotation of a spit member if the support portion of the accessory is not properly oriented with respect to the air intake grill of a surface ventilation system.

Vaughn, in U.S. Pat. No. 4,483,241 issued Nov. 20, 1984, shows a three-sided rotisserie assembly but does not include means requiring proper orientation of the assembly on the cooktop for operation of the rotisserie. A side wall is designed so that it is selectively removable and properly placed on the side opposite the air intake but there is no safeguard to prevent the user from improperly placing the side wall adjacent the air intake grill of a downdraft ventilation system.

U.S. Pat. Nos. 4,157,705; 4,422,441 and 4,517,955 issued on June 12, 1979; Dec. 27, 1983 and May 21, 1985 to Caan; Schoepe and Ehrlich et al. respectively are examples of typical folding range guards and splash shields. However, none of these guards and shields are used with rotisseries or in the environment of a surface ventilation system and therefore there is no necessity for providing an interlock.

The prior art has thus shown a rotisserie accessory which includes a three-sided rotisserie mounting structure. There has also been shown various folding splash guards for reducing splattering from items being cooked. There has not, however, been any teaching of an interlock device which requires the proper orientation of a rotisserie accessory on a cooktop and with respect to the air intake of a surface ventilation system before operation of the rotisserie accessory is permitted.

SUMMARY OF THE INVENTION

It is therefore an object of the instant invention to provide an improved rotisserie accessory for a cooking appliance.

It is a further object of the instant invention to provide an interlock for a rotisserie accessory requiring proper positioning of the accessory relative to the air intake of a surface ventilation system prior to operation thereof.

Briefly, the instant invention achieves these objects in a removable rotisserie accessory for use with a surface ventilated cooking appliance including burners and a surface ventilation air inlet grill disposed adjacent a generally horizontal cook surface. A shield and support structure has generally upstanding first and second end walls and an interconnecting side wall. A spit is adapted to support items to be cooked and is supported on the shield and support structure. Rotisserie apparatus is operable for rotating the spit about its axis. The shield and support structure is positionable on the cooking appliance in a proper posture with the burners between the end walls and between the interconnecting side wall and the air inlet grill to provide a shield on three sides of the burners while providing a generally unobstructed airflow path to the air inlet grill. The shield and support structure is also positionable on the cooking appliance in at least one improper posture. An interlock device is associated with the rotisserie accessory for preventing rotation of the spit when the shield and support structure is positioned in one of the improper postures and for permitting rotation of the spit when the shield and support structure is positioned in the proper posture.

Operation of the rotisserie interlock and further objects and advantages thereof will become evident as the description proceeds and from an examination of the accompanying five sheets of drawings.

BRIEF DESCRIPTION OF THE DRAWINGS

The drawings illustrate a preferred embodiment of the invention with similar numerals referring to similar parts throughout the several views, wherein:

FIG. 5 is a section view taken generally along lines 5—5 of FIG. 3 to further show the assembly of the interlock mechanism with respect to an end wall of the rotisserie accessory.

DESCRIPTION OF A PREFERRED EMBODIMENT

Figure 1:
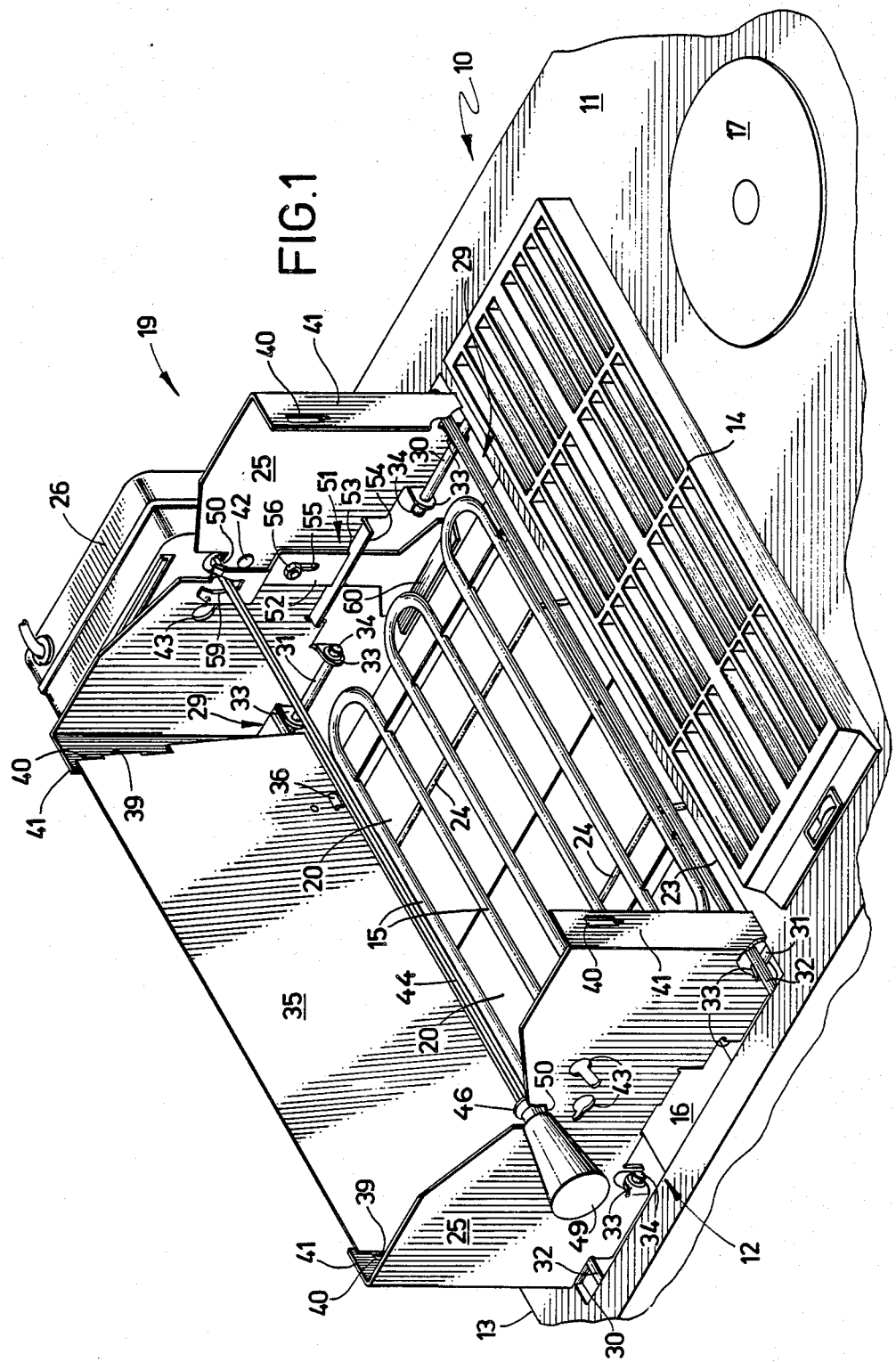
FIG. 1 is an isometric view which shows the rotisserie accessory properly positioned on the cook surface of a cooking appliance.
Figure 2:
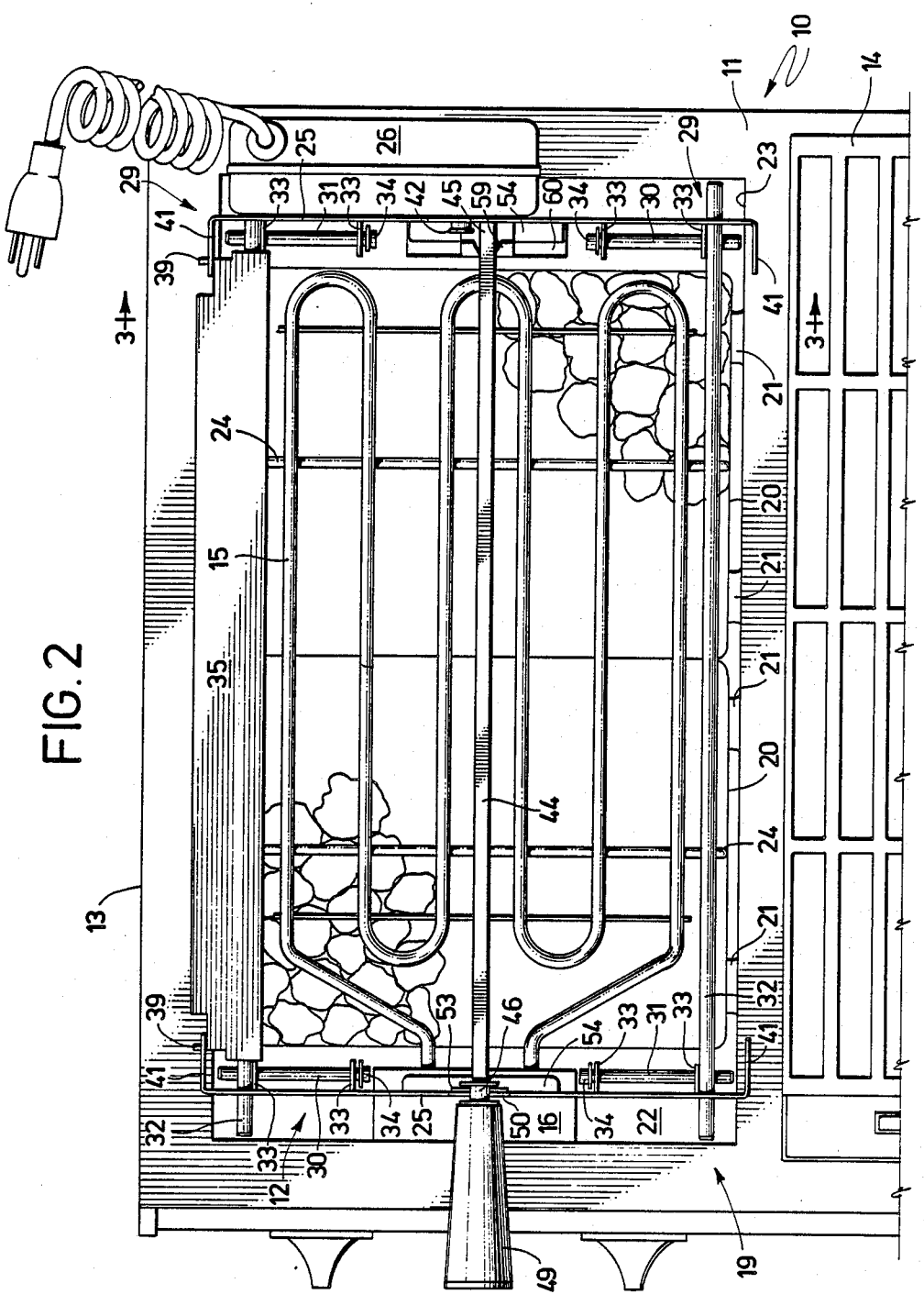
FIG. 2 is a top plan view also showing the rotisserie accessory properly positioned for operation on the cook surface of a cooking appliance.

Referring now to the drawings and in particular to FIGS. 1 and 2, there is shown an isometric and a top plan view of a cooking appliance 10. While FIGS. 1 and 2 generally depict only the left side of the cooking appliance 10, the right side can be of similar grill construction or conventional cooktop construction having surface burners 17 as in FIG. 1. The cooking appliance 10 of FIGS. 1 and 2 could be a free-standing or drop-in range or a counter-mounted cooktop and, although shown as an electrically heated unit, it is contemplated that a gas heated version could be utilized.

Figure 4:
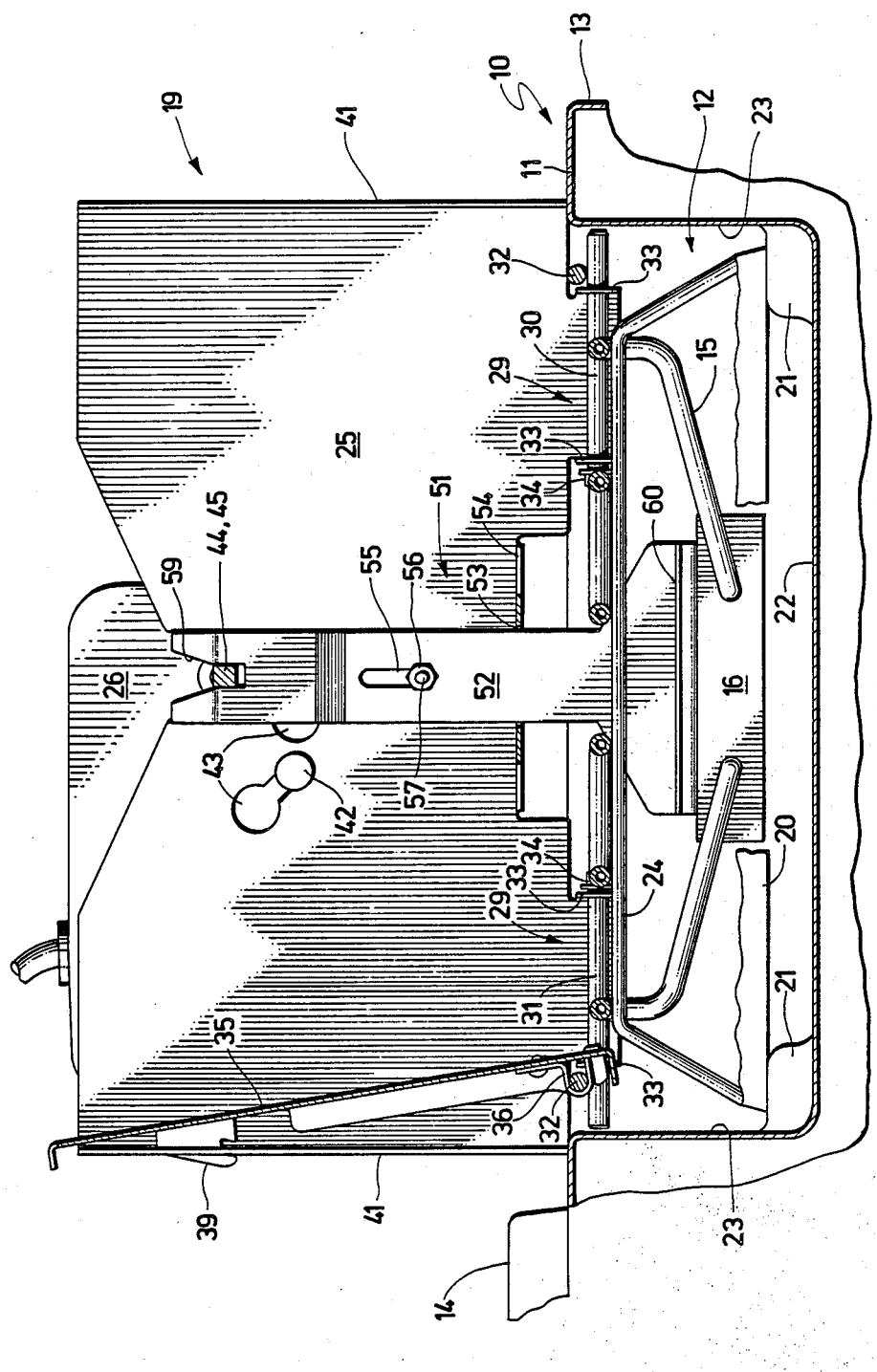
FIG. 4 is another section view showing the rotisserie accessory improperly positioned on the cooking appliance and showing the interlock mechanism engaged with the rotisserie spit.

As further shown in the drawings, the cooking appliance 10 has a generally horizontally disposed cooking surface 11. As further illustrated, a substantially rectangular recessed burner pan 12 is located between an outside edge or wall 13 of the cooking appliance 10 and a centrally located front to rear extending air intake grill 14. The air intake grill 14 is in airflow communication with a downdraft ventilation system associated with a surface ventilated range generally of the type as disclosed in, for example, U.S. Pat. No. 3,587,555 issued to Joseph J. Cerola on June 28, 1971. The recessed burner pan 12 can selectively receive a plurality of varied cooking units or cartridges and is shown in this embodiment with an electric grilling element 15. The electric grilling element 15 includes a generally rectangular connector plug 16 which extends into the recessed area of the burner pan 12 as best shown in FIGS. 1, 2 and 4.

When configured for a specialized cooking operation, including the use of the rotisserie accessory 19 with the electric grilling element 15, the recessed burner pan 12 mounts a pair of cast iron artificial grill-rock cartridges 20 on a plurality of embossments 21 formed in the bottom and side walls 22 and 23 of the burner pan 12. The grill-rock cartridges 20 are located below the electric grilling element 15 and are heated by radiated energy from the electric grilling element 15 during the cooking operation to effect the vaporization of meat juice droplets and provide a grilling flavor to the meat. Each grill-rock cartridge 20 includes a handle 24 which extends from side-to-side within the burner pan 12 and provides support for the electric grilling element 15.

Figure 3:
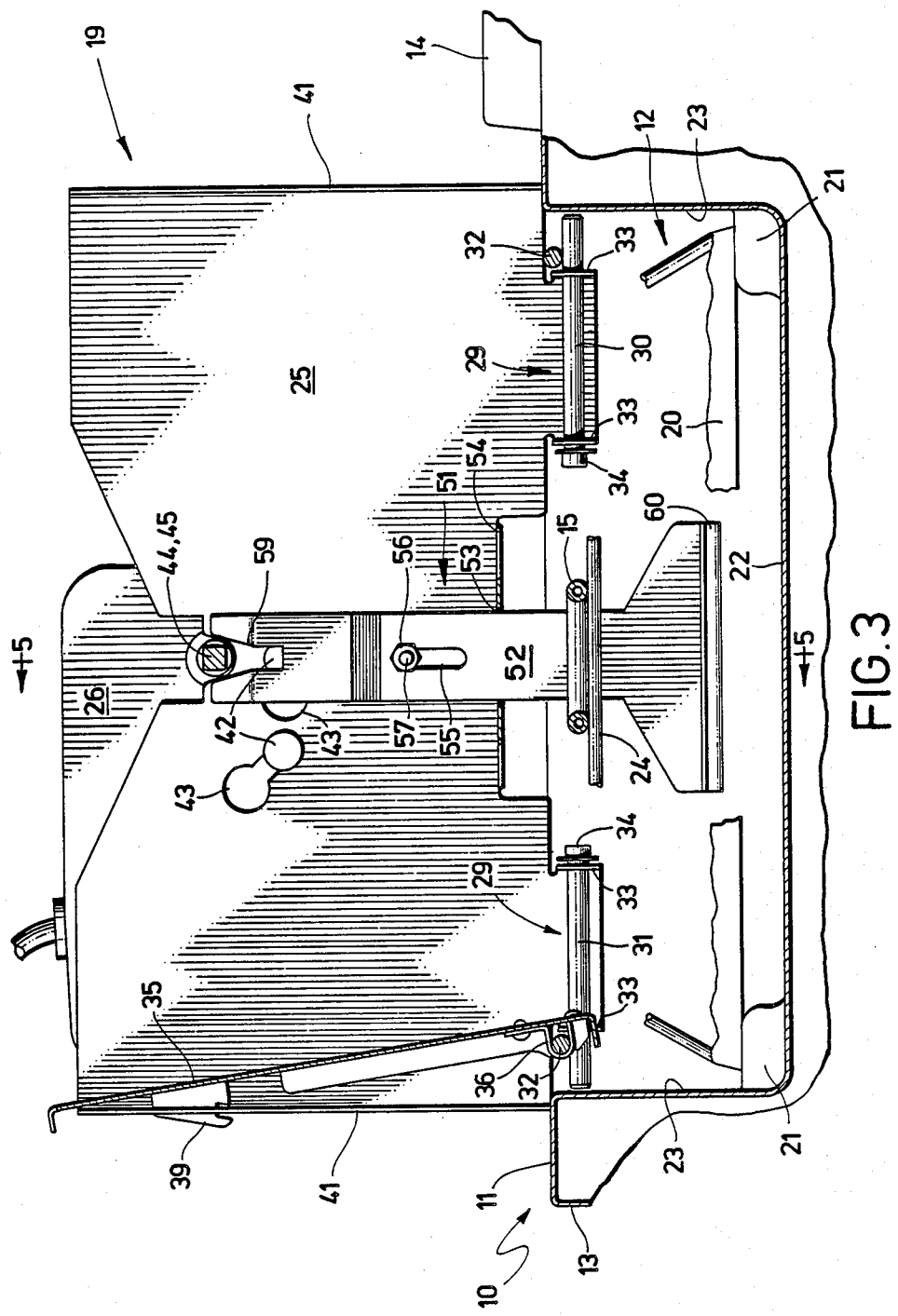
FIG. 3 is a section view taken generally along lines 3—3 of FIG. 2 and showing the interlock mechanism in a disengaged posture.

Referring again to FIGS. 1, 2 and 3, there is shown in the preferred embodiment of the instant invention, a three-sided shield and support structure for a free-standing open-bottomed rotisserie accessory 19 which is positioned over the burner pan 12 and electric grilling element 15 as illustrated in FIGS. 1 and 2 so that the electric grilling element 15 is positioned between the air intake grill 14 and the side wall 35 of the rotisserie accessory 19. The rotisserie accessory 19 includes a pair of end walls or panels 25 which are identical for purposes of manufacturing economy. The end walls or panels 25 are each configured for mounting the drive motor 26 so that the rotisserie accessory 19 can be used on either side of the cooking appliance 10 and yet keep the drive motor 26 at the desired rear location with the open side of the rotisserie accessory 19 adjacent the air intake grill 14. The end walls or panels 25 are pivotally mounted on a pair of wire supports 29 and in combination ensure the proper positioning of the rotisserie accessory 19 relative to the burner pan 12. As best shown in FIGS. 1, 2 and 3, each of the wire supports 29 comprises three wires 30, 31 and 32 welded together so that the short wires 30 and 31 are parallel to each other and at right angles to the long wire 32. The short wires 30 and 31 serve as shafts or axles for rotatably supporting the end walls or panels 25. Each end wall or panel 25 has four apertured projections 33 formed as two pairs with each pair being pivotally mounted on the axially aligned short wires 30 and 31 and held in place by a shaft retainer 34.

As further shown in FIGS. 1, 2 and 3, one of the wire supports 29 pivotally mounts the side wall or panel 35 on the long wire 32 and between the end walls or panels 25. The side wall 35 is pivotally mounted to the long wire 32 by a pair of U-shaped clips 36 which are mechanically fastened to the side wall 35. The side wall 35 includes a pair of lock tabs 39 which extend through mating slots 40 in side flanges 41 associated with each end panel 25 to maintain the side wall 35 in the proper operative posture. The lock tabs 39 of the side wall 35 can be disengaged from the end walls 25 and the side wall 35 can be folded along with the end walls 25 for storage.

It is contemplated that a variety of additional embodiments of the support and shield structure for the rotisserie accessory 19 are possible. The support structure could, for example, be formed integrally with the cooking surface 11 and could be designed so that the end and side walls 25 and 35 pivot between operable and inoperable postures or so that these end and side pieces could extend outward from or retract into the cooking surface 11. Also, the rotisserie accessory 19 is not to be limited only to the threesided construction of the preferred embodiment. It is anticipated that a structure having four walls could be utilized and that airflow requirements for drawing cooking vapors into the air intake grill 14 may be satisfied by the use of walls of varying heights and/or possibly louvered or perforated walls.

As previously discussed, the drive unit or motor 26 can be removably mounted on either end wall 25 by a pair of mounting studs 42 which are received in a pair of keyhole-like mounting slots 43 formed in the end walls 25. This arrangement is provided so that the rotisserie accessory 19 can be used on either the left or right side of the air intake grill 14 and still maintain proper positioning of the open side of the rotisserie accessory 19 adjacent the air intake grill 14 and the drive motor 26 at the rear of the cooking surface 11. A spit 44 has a square cross-section and a pointed end 45 of the spit 44 is engagingly received by the motor 26 to be driven thereby when the present invention is used as a rotisserie or as a shish kebab. A bearing 46 located adjacent the handle 49 of the spit 44 is rotatably received in a notch 50 in the opposed end wall 25 when the pointed end 45 of the spit 44 is received by the motor 26. For purposes of clarity, the spit 44 has been shown throughout the views without any meat holding devices or skewers. It is further anticipated that the spit 44 could be supported at each end wall 25 by a bearing structure similar to bearing 46 and that the motor 26 would not have to drivingly engage with an end of spit 44.

Since the end walls or panels 25 are identical, a spit locking member 51 could be attached to either end wall 25. As best shown in FIGS. 1, 2, 3 and 5, with the preferred embodiment of the rotisserie accessory 19 properly positioned over the rectangular burner pan 12 so that the electric grilling element 15 is located between the side wall 35 and the air intake grill 14, the spit locking member 51 is located at the rear of the burner pan 12 and is disengaged from the spit 44. The spit locking member 51 comprises a vertically elongated sheet metal part which is attached to an end wall 25 and has freedom to move in a sliding fashion relative to the end wall 25. The elongated body 52 of the spit locking member 51 is captured within an opening 53 formed in a tab 54 associated with the lower portion of the end wall 25. The body 52 of the spit locking member 51 includes a vertically oriented slot 55 which is slidable with respect to a shouldered nut 56 attached to the end wall 25 by the screw 57 and spaced directly above the opening 53 in the tab 54. The combination of the opening 53 and slot 55 permits limited vertical sliding movement of the spit locking member 51 with respect to and in close juxtaposition to the end wall 25.

As best shown in FIGS. 1, 3, 4 and 5, the upper end of the spit locking member 51 is offset away from the end wall 25 and has a Y-shaped notch opening 59. The Y-shaped notch opening 59 is sized to engage with the square cross-section of the spit 44. The bottom end of the spit locking member 51 also includes a foot portion 60 which projects angularly upward and away from the end wall 25.

When the rotisserie accessory 19 is properly positioned over the recessed burner pan 12, as shown in FIGS. 2 and 5, with the electric grilling element 15 disposed between the side wall 35 and the air intake grill 14, the spit locking member 51 will slide downwardly under the biasing influence of gravity to disengage the Y-shaped notch opening 59 from the spit 44. This disengaged posture will permit normal rotation of the spit 44 by the motor 26.

Improper positioning of the rotisserie accessory 19 results in poor smoke and vapor gathering for the surface ventilation system and exposes any surface adjacent the open side of the rotisserie accessory 19 to excess heat. Should the rotisserie accessory 19 be improperly positioned, as shown in FIG. 4, with the side wall 35 disposed between the electric grilling element 15 and the air intake grill 14, the foot portion 60 of the spit locking member 51 will contact the electrical connector plug 16 of the electric grilling element 15 and upwardly bias the Y-shaped notch opening 59 into engagement with the spit 44. Engagement of the spit 44 with the Y-shaped notch opening 59 will prevent its rotation. The operator of the cooking appliance 10 will thus be alerted that there is a problem with the rotisserie accessory 19. It is noted that if the heater means were, for example, a gas burner, a stud or sheet metal projection could be incorporated into a wall of the burner pan 12 for engaging with the foot portion 60 of the spit locking member 51.

It should also be appreciated that a reverse system of operation is possible wherein a spit locking member similar to item 51 would be gravitationally biased toward locking engagement with the spit 44. In this reverse system engagement of the foot portion with the connector plug 16 could effect the disengagement of the spit locking member similar to item 51 from the spit 44. Further, it is anticipated that the spit locking member similar to item 51 would not have to be incorporated into an end wall 25 but could be included in the structure forming the cooking surface 11 or the side wall 35.

There has thus been described herein an improved rotisserie accessory for a cooking appliance having a surface ventilation system. A shield and support structure is properly positioned on the cooking appliance with the cooking appliance burner disposed between the air inlet of the surface ventilation system and a side wall of the support structure. A spit supports items to be cooked and is rotatably mounted on the shield and support structure. A drive motor effects rotation of the spit and a spit locking member associated with the rotisserie accessory is operable for preventing rotation of the spit if the rotisserie accessory is improperly positioned on the cooking appliance.

In the drawings and specification, there has been set forth a preferred embodiment of the invention and although specific terms are employed, these are used in a generic and descriptive sense only and not for purposes of limitation. Changes in the form and proportion of parts as well as the substitution of equivalents are contemplated as circumstances may suggest or render expedient without departing from the spirit or scope of the invention as further defined in the following claims.

I claim:

1. A removable rotisserie accessory for use with a surface ventilated cooking appliance including burner means and a surface ventilation air inlet disposed adjacent a generally horizontal cook surface, the combination comprising: a shield and support structure having generally upstanding first and second end walls and an interconnecting side wall; spit means for supporting items to be cooked; means for supporting said spit means on said shield and support structure; means for rotating said spit means about its axis, said shield and support structure positionable on said cooking appliance in a proper posture with said burner means between said end walls and between said interconnecting side wall and said air inlet to provide a shield on three sides of said burner means while providing a generally unobstructed airflow path to said air inlet and also positionable on said cooking appliance in at least one improper posture; and interlock means associated with said rotisserie accessory for preventing rotation of said spit means when said shield and support structure is positioned in one of said improper postures and for permitting rotation of said spit means when said shield and support structure is positioned in said proper posture.

2. A removable rotisserie accessory as defined in claim 1 wherein said interlock means includes a member movably mounted on one of said cooking appliance and said rotisserie accessory for engagement with the other in one of said improper and proper postures.

3. A removable rotisserie accessory as defined in claim 1 wherein said interlock means includes a member movably mounted on said shield and support structure for engagement with said spit means to prevent rotation thereof when said shield and support structure is positioned in one of said improper postures.

4. A removable rotisserie accessory for use with a cooking appliance including burner means and a surface ventilation air inlet grill disposed adjacent a generally horizontal cook surface, the combination comprising: a shield and support structure having generally upstanding first and second end walls and an interconnecting side wall; spit means for supporting items to be cooked; means for supporting said spit means on said shield and support structure; means for rotating said spit means about its axis, said shield and support structure positionable on said cooking appliance in a proper posture with said burner means between said end walls and between interconnecting said side wall and said air inlet grill to provide a shield on three sides of said burner means while providing a generally unobstructed airflow path to said air inlet grill and also positionable on said cooking appliance in at least one improper posture; and interlock means associated with said rotisserie accessory for assuming a condition of engagement with said spit means to prevent rotation thereof when said shield and support structure is positioned in one of said improper postures and for assuming a condition of disengagement from said spit means to permit rotation thereof when said shield and support structure is positioned in said proper posture.

5. A rotisserie accessory as defined in claim 4 wherein said interlock means includes a member slidably attached to one of said first or second end walls and having a locking portion lockably engageable with said spit means.

6. A rotisserie accessory as defined in claim 4 wherein said interlock means includes structure engageable with said burner means when said shield and support structure is positioned in one of said improper postures.

7. A rotisserie accessory as defined in claim 4 wherein said interlock means is biased toward said condition of disengagement when said shield and support structure is properly positioned.

8. A removable rotisserie accessory for use with a cooking appliance including burner means and a surface ventilation air inlet grill disposed adjacent a generally horizontal cook surface, the combination comprising: a three-sided shield and support structure having generally upstanding first and second end walls and an interconnecting side wall; spit means for supporting items to be cooked; means for supporting said spit means on said shield and support structure; drive means for rotating said spit means about its axis, said shield and support structure positionable on said cooking appliance in a proper posture with said burner means between said end walls and between said side wall and said air inlet grill to provide a shield on three sides of said burner means while providing an unobstructed airflow path to said air inlet grill and also positionable on said cooking appliance in at least one improper posture; and interlock means associated with one of said first or second end walls including a body member movable with respect thereto, said body member having a locking portion lockably engageable with said spit means for preventing rotation thereof when said shield and support structure is positioned in one of said improper postures and disengageable from said spit means to permit rotation thereof when said shield and support structure is positioned in said proper posture.

9. A rotisserie accessory as defined in claim 8 wherein said burner means is mounted in a burner pan below said cook surface and said burner pan includes structure engageable with said interlock means for moving said locking portion into engagement with said spit means responsive to said improper posture of said shield and support structure.

10. A rotisserie accessory as defined in claim 8 wherein said burner means includes an electric heating element and said interlock means is engageable therewith when said shield and support structure is improperly positioned.

11. A rotisserie accessory as defined in claim 8, wherein said locking portion of said interlock means includes means defining a notch configured to correspond to the cross-sectional shape of said spit means.

* * * * *